(12) United States Patent
Yeung et al.

(10) Patent No.: US 11,012,598 B2
(45) Date of Patent: May 18, 2021

(54) APPARATUS USING REFLECTIVE ELEMENTS FOR ALIGNING A LENS MODULE WITH AN IMAGE SENSOR

(71) Applicant: ASM Technology Singapore Pte Ltd, Singapore (SG)

(72) Inventors: Koon Sung Yeung, Hong Kong (HK); Po Lam Au, Hong Kong (HK); Fan Leuk Lai, Hong Kong (HK); Chi Piu Wong, Hong Kong (HK); Kwong Sik Chan, Hong Kong (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 0 days.

(21) Appl. No.: 16/548,893

(22) Filed: Aug. 23, 2019

(65) Prior Publication Data

US 2021/0058536 A1    Feb. 25, 2021

(51) Int. Cl.
*H04N 5/225* (2006.01)
*H04N 17/00* (2006.01)

(52) U.S. Cl.
CPC ......... *H04N 5/2254* (2013.01); *H04N 17/002* (2013.01)

(58) Field of Classification Search
CPC .............................. H04N 5/225; H04N 17/002
USPC .................................................... 348/207.99
See application file for complete search history.

(56) References Cited

U.S. PATENT DOCUMENTS

| 2012/0147196 | A1* | 6/2012 | Lin ........................ G02B 26/04 348/187 |
| 2015/0138372 | A1* | 5/2015 | Apel ...................... G02B 27/36 348/188 |
| 2016/0094841 | A1* | 3/2016 | Wang ................... H04N 17/002 348/44 |
| 2020/0084438 | A1* | 3/2020 | Avraham .......... H01L 27/14625 |
| 2020/0329181 | A1* | 10/2020 | Lee ........................ G02B 27/62 |

* cited by examiner

*Primary Examiner* — Anthony J Daniels
(74) *Attorney, Agent, or Firm* — Ostrolenk Faber LLP

(57) ABSTRACT

An apparatus for aligning a lens module with an image sensor to form a camera module includes a chart holder, a positioning unit and a reflective elements holder assembly. In use, the chart holder holds a test chart having a region of interest (ROI), the positioning unit holds the lens module and the image sensor, and the reflective elements holder assembly holds multiple reflective elements between the chart holder and the positioning unit. A first optical path from the ROI is directed to a first position on the image sensor. Second optical paths from the ROI are reflected by the reflective elements to respective second positions on the image sensor, the second positions being spaced from the first position. The images captured by the image sensor (arising from the aforementioned optical paths) are analysed and the positioning unit aligns the lens module with the image sensor based on such analysis.

19 Claims, 12 Drawing Sheets

| 802 | | | | | | |
|---|---|---|---|---|---|---|
| Diagonal FOV θ of lens module 202 | 40 | 60 | 80 | 100 | 120 | 130 |
| Diagonal FOV ø of relay lens 224 | 34.86 | 51.86 | 68.3 | 83.88 | 98.06 | 104.26 |
| Distance $D_f$ between the projection point 504 of the relay lens 224 and the lens module 202 | 8.85 | 8.44 | 7.68 | 6.26 | 3.4 | 0.71 |

$D_f = 4.5mm\ when\ \Theta = 114$

APPARATUS USING REFLECTIVE ELEMENTS FOR ALIGNING A LENS MODULE WITH AN IMAGE SENSOR

FIELD OF THE INVENTION

The present invention relates to an apparatus using reflective elements for aligning a lens module and an image sensor to form a camera module, such as, but not limited to a wide field of view (WFOV) camera module.

BACKGROUND OF THE INVENTION

Camera modules for use in mobile devices such as cell phones, tablets and laptop computers typically include a lens module assembled with an image sensor. The performance of these camera modules can be extremely sensitive to misalignment between the lens module and the image sensor. In particular, misalignment between the lens module and the image sensor may cause the images captured by the camera module to be out of focus. Accordingly, during the assembly of a camera module, an active alignment process should be performed to align the lens module and the image sensor.

FIG. 1 shows a perspective view of a prior art apparatus 100 for aligning a lens module 102 (having a lens 102a received in a lens housing 102b) with an image sensor 104. As shown in FIG. 1, a typical active alignment process involves the use of a test chart 106 having a plurality of regions of interest 106a-106e. During the alignment process, the test chart 106 is illuminated. The lens module 102 is positioned at a test distance 108 from the test chart 106 and the image sensor 104 is positioned below the lens module 102. The image sensor 104 is electrically connected to a circuit board and activated. Images of the test chart 106 are then captured by the image sensor 104 at varying test distances 108. The regions of interest 106a-106e in these captured images are analysed and based on the analysis, the relative arrangement between the lens module 102 and the image sensor 104 is adjusted to obtain a correct alignment of the image sensor 104 relative to the image plane of the lens 102a.

In a typical active alignment process, the size of the test chart 106 is dependent on the test distances 108 and the field of view (FOV) of the lens 102a in the lens module 102. With an increasing demand for wider FOV of the camera modules, larger test distances 108 and larger test charts 106 are required for performing the active alignment process. This in turn increases the size of the apparatus 100. As a result, more space in the clean room is required to house each apparatus 100. It would be beneficial to reduce a size and footprint required for such apparatus.

SUMMARY OF THE INVENTION

The present invention aims to provide a new and useful apparatus for aligning a lens module and an image sensor to form a camera module.

According to an aspect of the present invention, there is provided an apparatus for aligning a lens module with an image sensor to form a camera module, the apparatus including: a chart holder configured to hold a test chart including a region of interest; a positioning unit including a lens module holder configured to hold the lens module and a sensor holder configured to hold the image sensor, wherein the positioning unit is operative to adjust a relative arrangement between the lens module holder and the sensor holder to align the lens module with the image sensor; and a reflective elements holder assembly configured to hold a plurality of reflective elements between the chart holder and the positioning unit; wherein the positioning unit is arranged relative to the chart holder to form a first optical path from the region of interest to be directed to a first position on the image sensor; and wherein the plurality of reflective elements are positioned to form second optical paths by reflection from the region of interest to respective second positions on the image sensor, the second positions being spaced from the first position on the image sensor.

By providing the above-mentioned apparatus, smaller test charts and smaller test distances may be used. For example, a smaller test chart including only a single region of interest (ROI) can be used since this single ROI can be reflected onto various positions on the image sensor, such that the resulting image captured by the image sensor contains multiple spaced-apart ROI images to facilitate the image analysis required for improving the alignment between the lens module and the image sensor. By reducing the size of the test chart and the length of the test distance, the size of the apparatus can be correspondingly reduced (in other words, the machine footprint can be reduced). In turn, less space is required to house the apparatus and the assembly process of the camera modules can be more cost-effective.

The plurality of reflective elements may include opposing reflective elements facing a center of the reflective elements holder assembly. With oppositely facing reflective elements, the resulting image captured by the image sensor can be symmetric, similar to an image of a typical test chart captured by the image sensor of a prior art apparatus. Accordingly, the algorithms used to process images captured by prior art apparatuses may still be used, thus obviating the need to develop new algorithms.

The plurality of reflective elements may be arranged to form the second optical paths by reflecting the second optical paths more than once between the region of interest and the image sensor. This allows the image sensor to be placed further away from the test chart. Therefore, images captured by the image sensor at larger distances from the test chart can also be assessed for improving the alignment between the lens module and the image sensor.

The apparatus may further include a base unit configured to support the reflective elements holder assembly. The base unit may have a hole to allow the first and second optical paths to pass through and the plurality of reflective elements may be circumferentially arranged around the hole of the base unit. For example, each reflective element may be equally spaced from adjacent reflective elements around the hole of the base unit. This arrangement of the reflective elements helps to direct the second optical paths towards the hole of the base unit to the image sensor.

Each reflective element may be arranged to extend along an axis parallel to an axis extending between the chart holder and the lens module holder, such as a vertical axis. This helps to direct the second optical paths from the region of interest to the image sensor.

The reflective elements holder assembly may include a plurality of spaced-apart mounts, each mount configured to hold at least one of the reflective elements. By using spaced-apart mounts to hold the reflective elements, the weight of the reflective elements holder assembly (and hence, the apparatus) can be lower.

The plurality of reflective elements may include first reflective elements and second reflective elements, wherein the first reflective elements are arranged nearer to the chart holder than the second reflective elements. The first and second reflective elements can cooperate to reflect the second optical paths more than once, so that the image sensor can be placed nearer to from the test chart while achieving a longer imaging distance.

Each first reflective element and its corresponding second reflective element may be arranged to extend along a same axis. This helps to simplify the design of the reflective elements holder assembly and the positioning of the reflective elements.

The reflective elements may be configured to have a size dependent on a size of the region of interest of the test chart. For example, the second optical paths may form a first reflected image in each first reflective element. Each first reflected image may include an image of the region of interest and each first reflective element may have a size which is at least twice of a size of the region of interest. This helps to reduce the chances of the region of interest being absent in the first reflected images due to slight misalignment of the first reflective elements with respect to the region of interest.

Reflections along the second optical paths by the first reflective elements may form a second reflected image in each second reflective element. Each second reflected image may include an image of the region of interest of the test chart and an image of one of the first reflective elements. By arranging each second reflective element to reflect the entire first reflective element, the chances of the region of interest being absent in the second reflected image may be reduced.

The first reflective elements may be of a same size or larger than the second reflective elements. Having first reflective elements that are the same size as or larger than the second reflective elements helps to reduce the chances of the region of interest being absent in the first reflected images. Moreover, by configuring the second reflective elements to be smaller than the first reflective elements, the apparatus can be made lighter. The first reflective elements and the second reflective elements may be respectively positioned a first distance and a second distance away from the chart holder, and a ratio of the first distance to the second distance may be about 1:3.

The apparatus may further include a relay lens arranged between the positioning unit and the reflective elements holder assembly. This allows the simulation of virtual test distances greater than the physical distance between the test chart and the relay lens. For example, the virtual test distance may be infinity even if the physical distance between the test chart and the relay lens is finite. A distance between the second reflective elements and the chart holder may be approximately three quarters of a distance between the chart holder and a focal point of the relay lens.

The region of interest of the test chart may be positioned at a center of the test chart and the first position on the image sensor may be at a center of the image sensor. Further, the second positions on the image sensor may be at corners of the image sensor. This allows the resulting image captured by the image sensor to be similar to images captured by the image sensor of a prior art apparatus. Accordingly, algorithms for analysing the images of prior art apparatuses may still be used.

The plurality of reflective elements may include multiple small mirrors, which may help reduce the costs and weight of the apparatus.

BRIEF DESCRIPTION OF THE FIGURES

Embodiments of the invention will now be illustrated for the sake of example only with reference to the following drawings, in which.

DETAILED DESCRIPTION OF THE EMBODIMENTS

Figure 1:
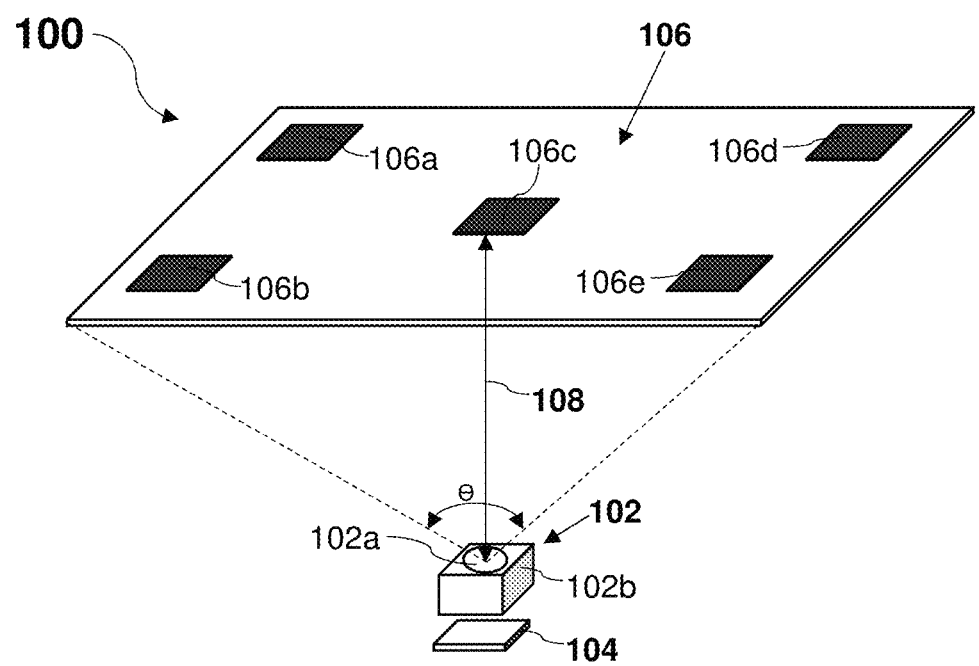
FIG. 1 shows a perspective view of a prior art apparatus for aligning a lens module and an image sensor to form a camera module.
Figure 2A:
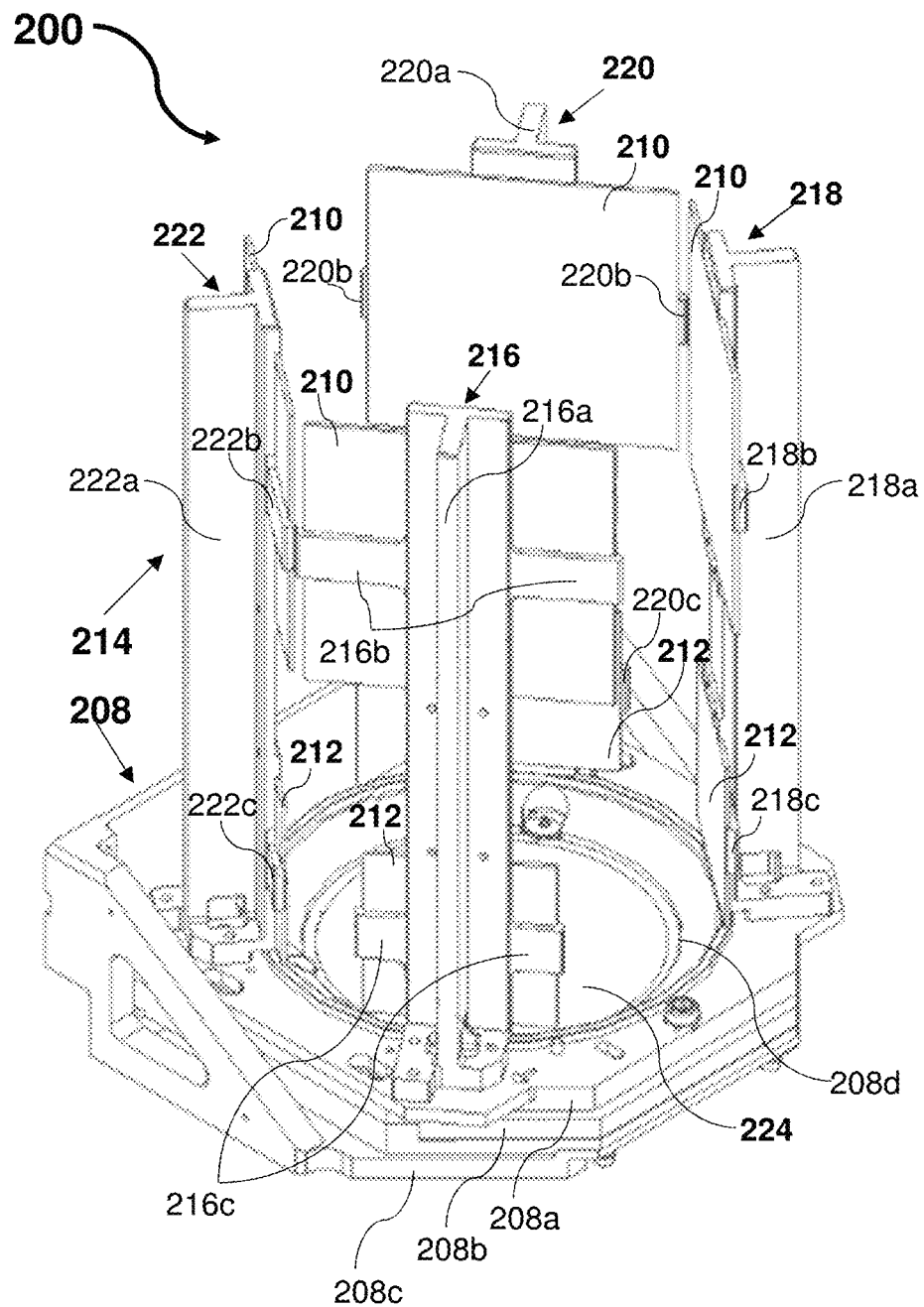
FIGS. 2A and 2B respectively show a perspective view and a schematic cross-sectional view of an apparatus for aligning a lens module and an image sensor to form a camera module according to an embodiment of the present invention.
Figure 2B:
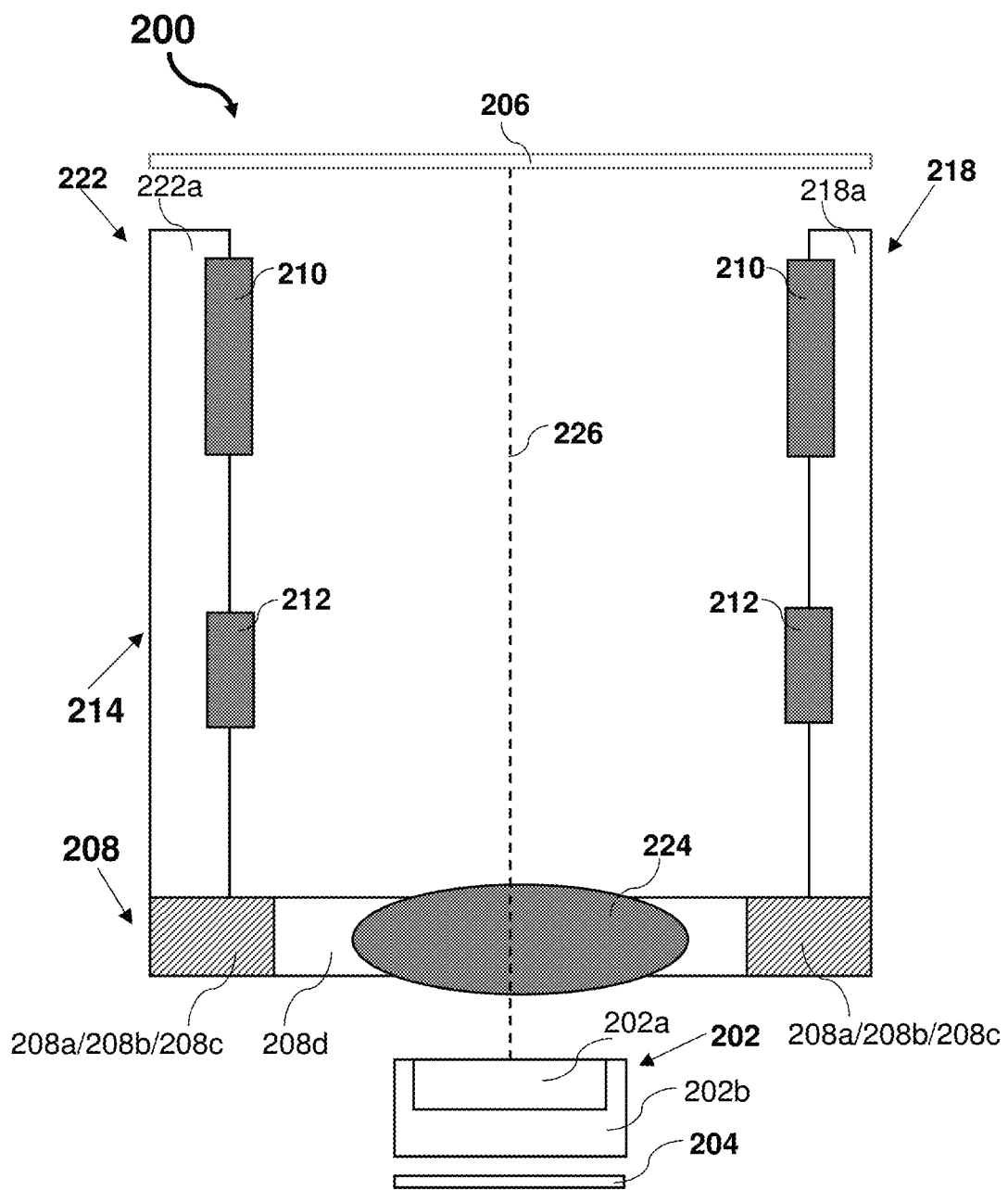

FIG. 2A and FIG. 2B respectively show a perspective view and a schematic cross-sectional view of an apparatus 200 for aligning a lens module with an image sensor to form a camera module according to an embodiment of the present invention. As shown in FIG. 2B, the lens module 202 comprises a lens 202a and a lens housing 202b for holding the lens 202a.

The apparatus 200 includes a chart holder 206 configured to hold a test chart. The apparatus 200 further includes a positioning unit that comprises a lens module holder (not shown) configured to hold the lens module 202 and a sensor holder (not shown) configured to hold the image sensor 204. The positioning unit is operative to adjust a relative arrangement between the lens module holder and the sensor holder to align the lens module 202 with the image sensor 204. The apparatus 200 also includes an illuminator operative to illuminate the test chart. For simplicity, the positioning unit and the illuminator are not shown in the figures, whereas the chart holder 206 is shown only in FIG. 2B.

Referring to FIGS. 2A and 2B, the apparatus 200 further includes a base unit 208 in the form of a base mount having a top layer 208a, a middle layer 208b and a bottom layer 208c. Although not shown in the figures, the positioning unit of the apparatus 200 is attached below the base unit 208, in particular, to the bottom layer 208c of the base unit 208. The top, middle and bottom layers 208a, 208b, 208c of the base unit 208 include circular holes of different diameters and are arranged to form a conic frustum receptacle 208d with a hole at the bottom. This hole at the bottom of the base unit 208 serves to allow optical paths from the test chart to pass through it to reach the image sensor 204.

The apparatus 200 also includes a reflective elements holder assembly 214 in the form of a mirror mount configured to hold a plurality of reflective elements 210, 212 arranged opposite to each other and facing a center of the reflective elements holder assembly 214. The reflective elements 210, 212 are in the form of mirrors between the chart holder 206 and the positioning unit. The reflective elements holder assembly 214 is supported by the base unit 208. More specifically, the reflective elements holder assembly 214 includes a plurality of spaced-apart mounts 216, 218, 220, 222 connected to the top layer 208a of the base unit 208.

As shown in FIG. 2A, each mount 216, 218, 220, 222 has an elongate member 216a, 218a, 220a, 222a extending away from the base unit 208. Each mount 216, 218, 220, 222 further includes a first pair of arms 216b, 218b, 220b, 222b configured to hold a first reflective element 210 and a second pair of arms 216c, 218c, 220c, 222c configured to hold a second reflective element 212. Each pair of arms 216b-222b, 216c-222c is arranged to extend from the elongate member 216a-222a along a direction perpendicular to a length of the elongate member 216a-222a. Further, each pair of arms 216b-222b, 216c-222c is configured such that the reflective element 210, 212 held by the pair of arms 216b-222b, 216c-222c extends along an axis parallel to an axis extending between the chart holder 206 and the lens module holder holding the lens module 202 (such a vertical axis 226). As shown in FIG. 2A, the first pairs of arms 216b-222b in each mount 216-222 are arranged nearer the chart holder 206 than the second pairs of arms 216c-222c. In other words, the first reflective elements 210 are arranged nearer the chart holder 206 than the second reflective elements 222. In the apparatus 200, the first reflective elements 210 are larger in size (have larger lengths and larger widths) as compared to the second reflective elements 212. Accordingly, the first pairs of arms 210b-222b are longer than the second pairs of arms 210c-222c.

Referring to FIG. 2A, the plurality of mounts 216, 218, 220, 222 are arranged around a circumference of the receptacle 208d and are equally spaced apart from one other. Accordingly, the reflective elements 210, 212 are also generally circumferentially arranged around the receptacle 208d (or in other words, around the hole of the base unit 208 at the bottom of the receptacle 208d), where each reflective element 210, 212 is equally spaced from adjacent reflective elements 210, 212 around the receptacle 208d. Each first reflective element 210 is arranged to directly face another first reflective element 210, whereas each second reflective element 212 is arranged to directly face another second reflective element 212.

The apparatus 200 also includes a relay lens 224 arranged between the positioning unit and the reflective elements holder assembly 214, in other words, between the lens module 202 and the plurality of reflective elements 210, 212. More specifically, the relay lens 224 is received within the conic frustum receptacle 208d.

Figure 3A:
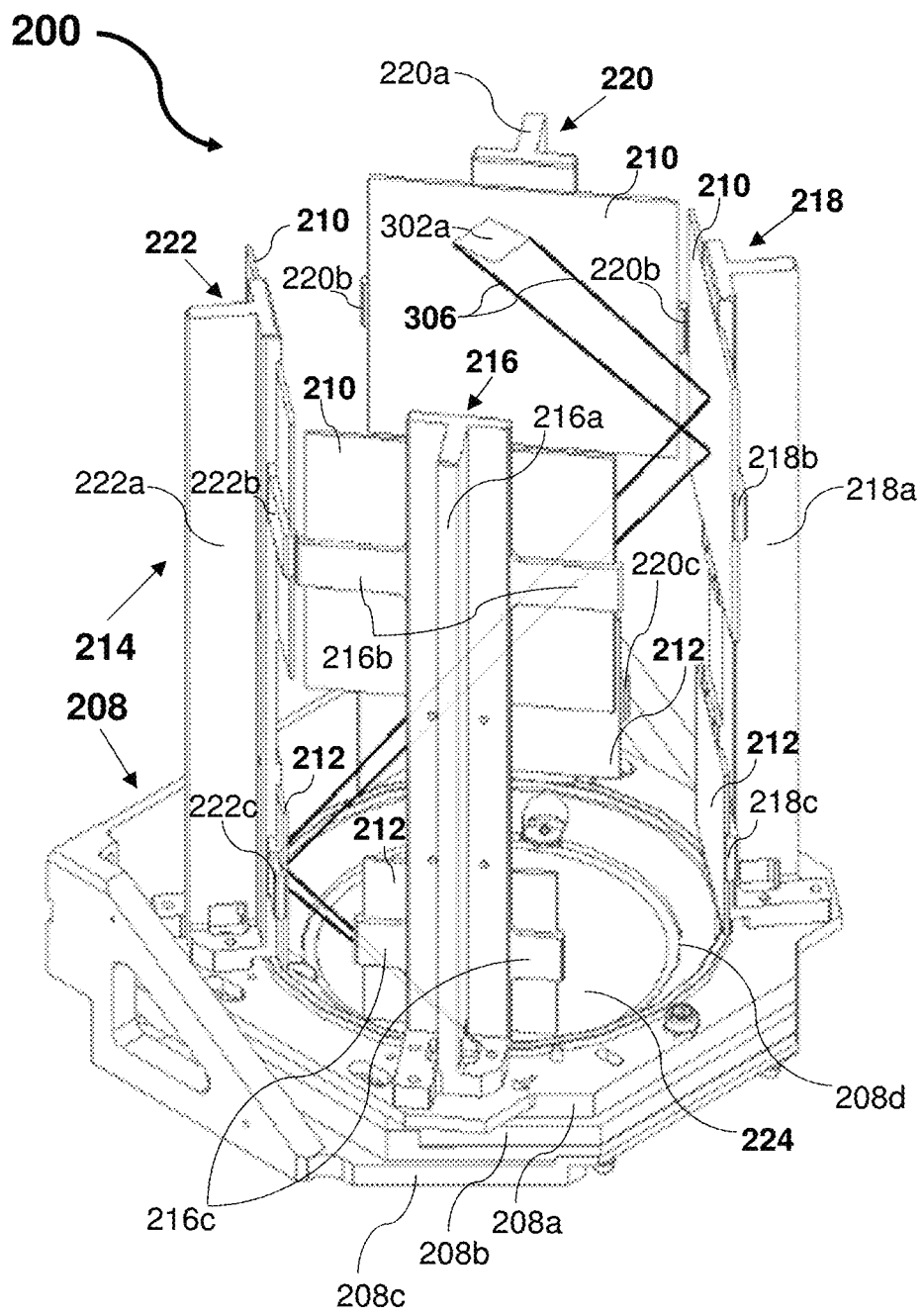
FIGS. 3A and 3B respectively show a perspective view and a schematic cross-sectional view of the apparatus of FIGS. 2A and 2B in use.
Figure 3B:
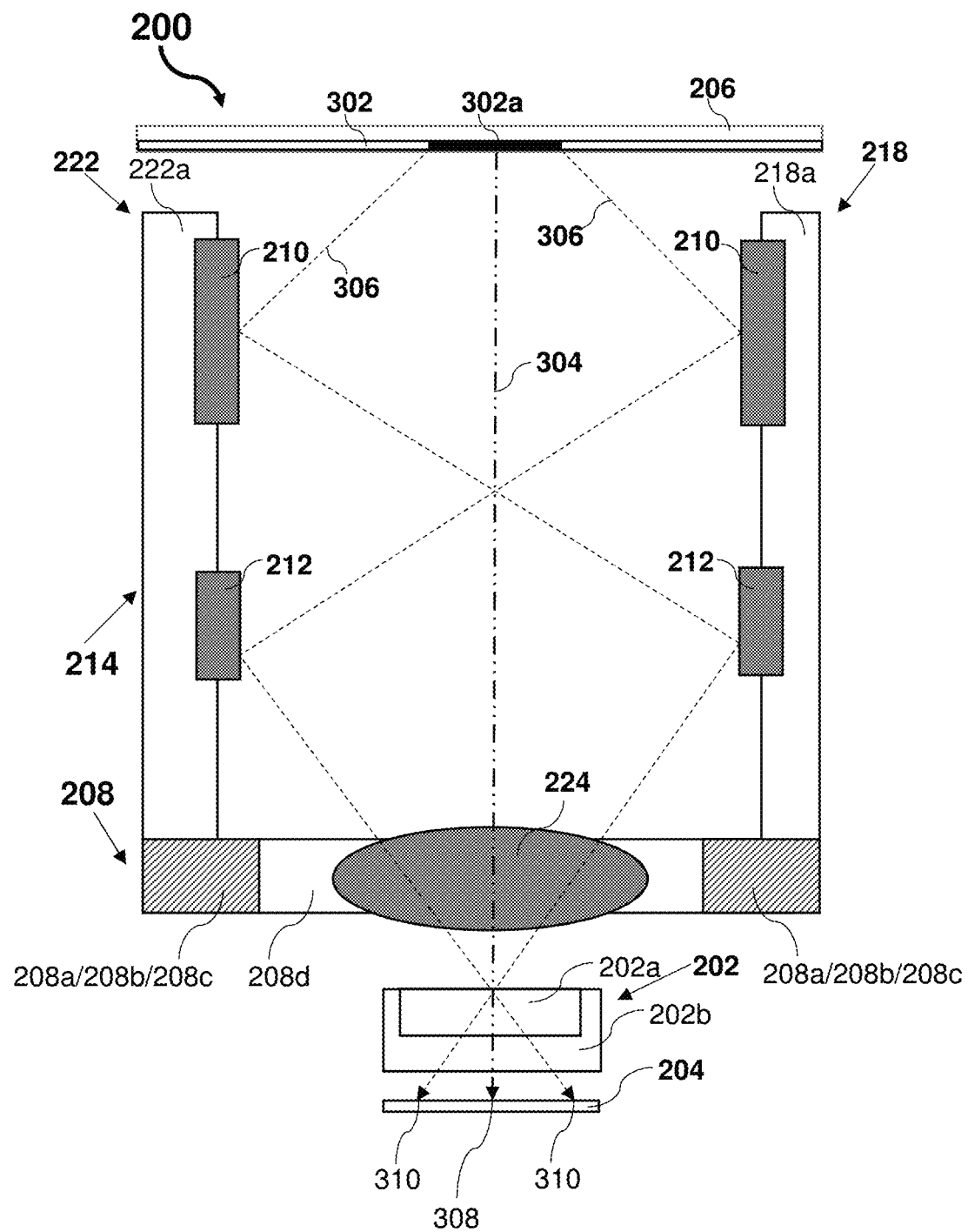

FIGS. 3A and 3B show the apparatus 200 in use. In use, a test chart 302 having a region of interest (ROI) 302a at its center is held by the chart holder 206 and is illuminated by the illuminator (not shown in the figures). The positioning unit (holding the lens module 202 and the image sensor 204) is arranged relative to the chart holder 206 to form a first optical path 304 from the ROI 302a of the test chart 302 to be directed to a first position 308 on the image sensor 204. The plurality of reflective elements 210, 212 are positioned to reflect second optical paths 306 from the ROI 302a of the test chart 302 to respective second positions 310 on the image sensor 204. The second positions 310 are spaced from the first position 308 on the image sensor 204. As more clearly shown in FIG. 3B, the plurality of reflective elements 210, 212 are arranged to reflect the second optical paths 306 more than once between the ROI 302a and the image sensor 204. More specifically, each second optical path 306 is first reflected by a first reflective element 210 and then further reflected by a second reflective element 212 onto the image sensor 204. Accordingly, the second optical paths 306 form a first reflected image in each first reflective element 210, where the first reflected image comprises an image of the ROI 302a. Reflection of the second optical paths 306 by the first reflective elements 210 form a second reflected image in each second reflective element 212. The second reflected image comprises an image of the ROI 302a and an image of one of the first reflective elements 210. Images arising from these first and second optical paths 304, 306 are captured by the image sensor 204 and are analysed. Based on the analysis, the positioning unit adjusts a relative arrangement between the lens module holder and the sensor holder to achieve the best alignment between the lens module 202 and the image sensor 204.

Figure 4:
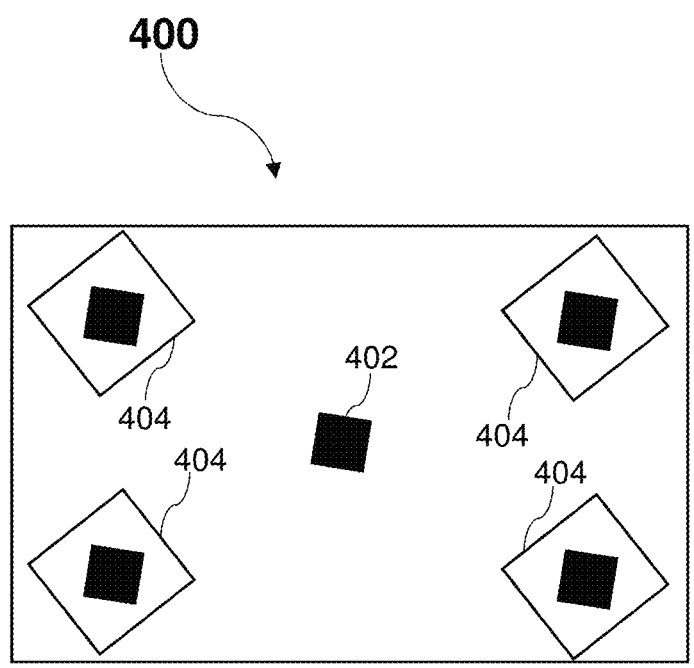
FIG. 4 shows an image captured by the image sensor of the apparatus of FIGS. 2A and 2B when the apparatus is in use.

FIG. 4 shows an image 400 of the test chart 302 including the ROI 302a as captured by the image sensor 204 of the apparatus 200. As shown in FIG. 4, the image 400 includes a first ROI image 402 formed via the first optical path 304 directed to the first position 308 on the image sensor 204, where the first position 308 is a center of the image sensor 204. The image 400 further includes second ROI images 404 formed via the second optical paths 306 reflected by the plurality of reflective elements 210, 212. In particular, each of these second ROI images 404 contains a reflection of the ROI 302a together with a reflection of one of the first reflective elements 210. The second ROI images 404 are at positions corresponding to the second positions 310 on the image sensor 204, where the second positions 310 are configured at corners of the image sensor 204. More specifically, these positions of the second ROI images 404 correspond to a field of view of 0.8 (0.8 F) of the image sensor 204. However, these positions may be adjusted (to for example, 0.5 F or 1 F) by adjusting the positions of the reflective elements 210, 212.

By using the reflective elements 210, 212 to reflect the ROI 302a onto the image sensor 204, the resulting image captured by the image sensor 204 is configured to contain multiple ROI images even with a smaller test chart 302 comprising only a single ROI 302a. Therefore, the required size of the test chart 302 may be reduced. In turn, the size of the apparatus 200 can be reduced. This can help decrease the amount of space required to house the apparatus 200 and thus, the assembly of the camera modules can be made more cost-effective.

Figure 5:
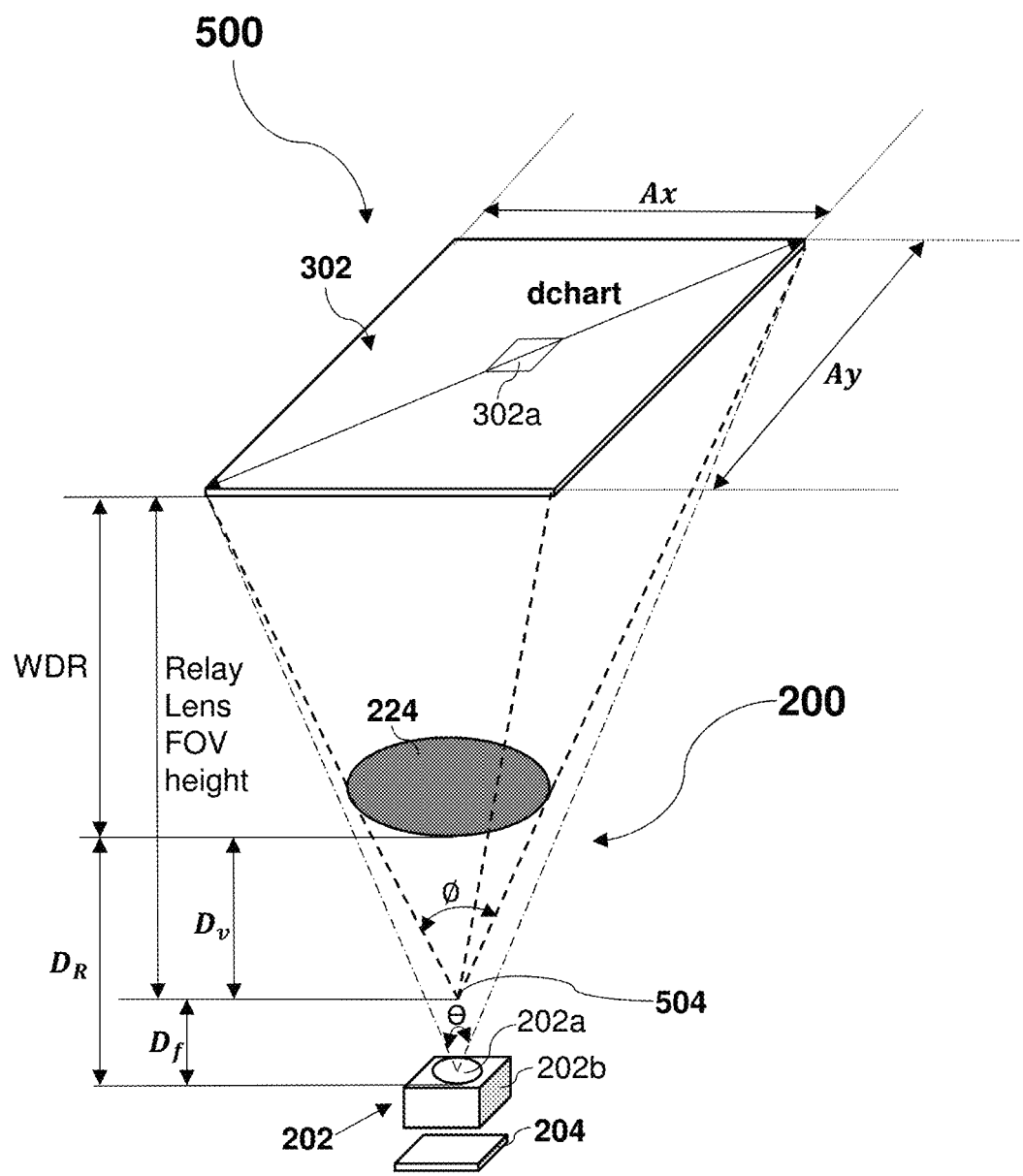
FIG. 5 shows an exemplary setup of the apparatus of FIGS. 2A and 2B with a test chart having a region of interest at its center.

FIG. 5 shows a simplified perspective view of an exemplary setup 500 of the apparatus 200 with the test chart 302 having the ROI 302a at its center. As shown in FIG. 5, the test chart 302 has a length Ay, a width Ax and a chart diagonal dchart. In the setup 500, the relay lens 224 is positioned at a distance WDR (also referred to as the real test distance) from the test chart 302 and a distance of $D_R$ from the lens module 202. Note that because of the use of the relay lens 224, the apparatus 200 may be configured with a virtual test distance (WDV) of 2 m, 5 m or infinity, even though the WDR is actually shorter. Further, a focal point 504 of the relay lens 224 is positioned at a distance $D_f$ from the lens module 202 and a distance $D_v$ from the relay lens 224. The lens module 202 has a diagonal field of view (FOV) ⊖, whereas the relay lens 224 has a diagonal FOV Ø and a relay lens FOV height that is a sum of the distance $D_v$ and the distance WDR.

Figure 6:
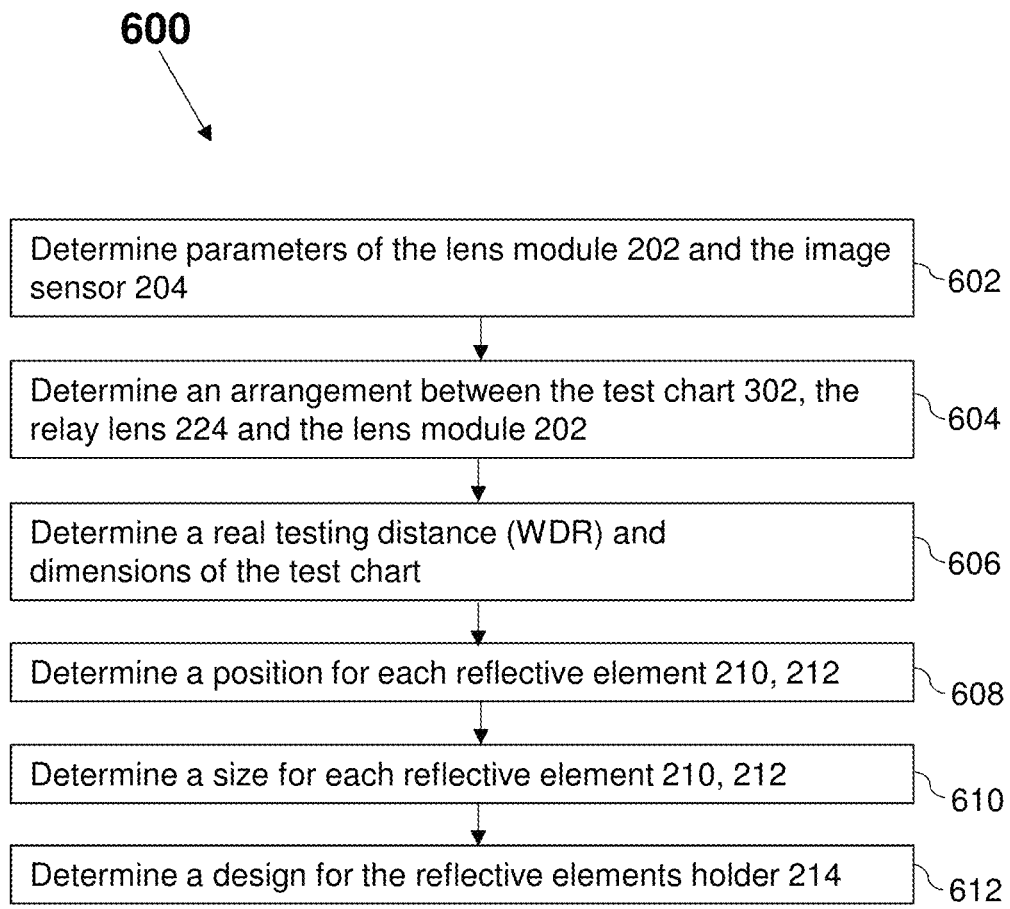
FIG. 6 is a flow chart of a method for determining a design of a reflective elements holder assembly for the setup of FIG. 5.

FIG. 6 is a flow chart of a method 600 for determining a design of the reflective elements holder assembly 214 for the setup 500 of FIG. 5.

The method 600 begins by determining (at 602) parameters of the lens module 202 and the image sensor 204 from for example, data sheets provided by the manufacturers of the lens module 202 and image sensor 204. The parameters determined at 602 include the diagonal FOV ⊖ of the lens module 202 and a sensor ratio/sensor array size of the image sensor 204.

Figure 7A:
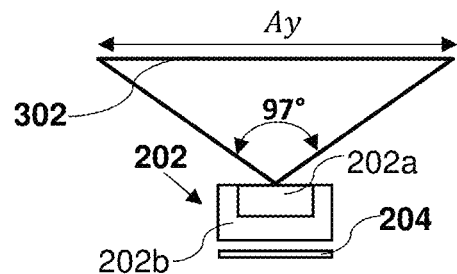
FIGS. 7A, 7B and 7C show respective fields of view of the lens module with respect to length, width and diagonal perspectives of the test chart for the setup of FIG. 5.
Figure 7B:
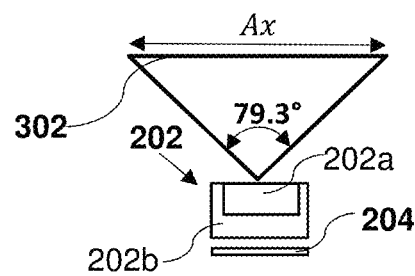
Figure 7C:
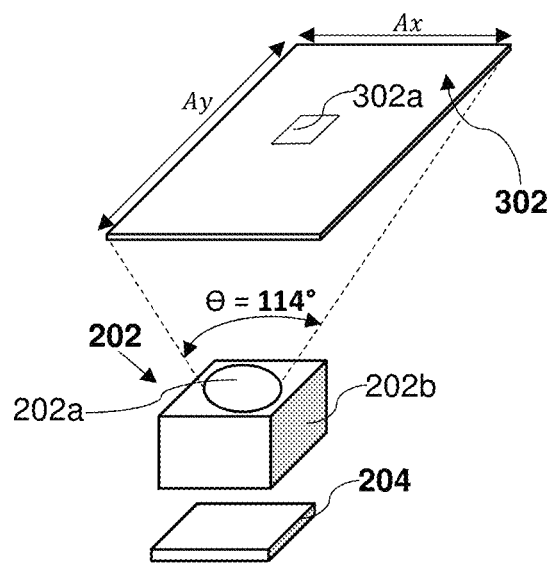

For example, as shown in FIG. 7A, an FOV of the lens module 202 across a length Ay of the test chart 302 may be 97 degrees. As shown in FIG. 7B, an FOV of the lens module 202 across a width Ax of the test chart 302 may be 79.3 degrees. With the aforementioned length-wise FOV and width-wise FOV, the diagonal FOV ⊖ of the lens module 202 across a diagonal of the test chart 302 may be 114 degrees. A sensor ratio of the image sensor 204 may be x:y=4:3 and an array size of the image sensor 204 may be X:Y=5184:3880.

Referring to FIG. 6, at 604, the method 600 determines an arrangement between the test chart 302, the relay lens 224 and the lens module 202 using the diagonal FOV ⊖ of the lens module 202 (determined at 602). In particular, at 604, the distance $D_f$ between the focal point 504 and the lens module 202, and the distance $D_v$ between the focal point 504 and the relay lens 224 are determined.

Figures 8A, 8B:
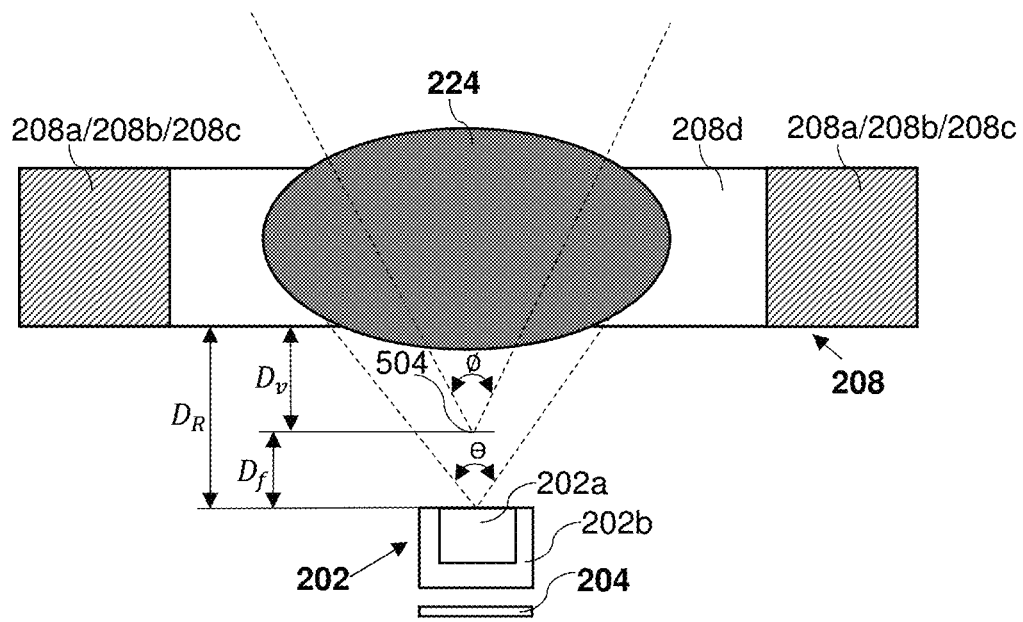
FIG. 8A shows a magnified cross-sectional view of an arrangement between the lens module and a relay lens of the setup of FIG. 5
FIG. 8B is an exemplary table relating the diagonal fields of view of the lens module and the relay lens.

FIG. 8A shows a magnified cross-sectional view of the arrangement between the lens module 202 and the relay lens 224, whereas FIG. 8B is an exemplary data table 802 relating the diagonal FOV ⊖ of the lens module 202 to the diagonal FOV Ø of the relay lens 224 and the distance $D_f$. At 604, the diagonal FOV ⊖ of the lens module 202 (determined at 602) is used together with the data table 802 to determine the distance $D_f$. For example, if the diagonal FOV ⊖ of the lens module 202 is determined (at 602) to be 114 degrees, the distance $D_f$ may be determined (at 604) as 4.5 mm. The diagonal FOV Ø of the relay lens 224 may be similarly determined from the data table 802. The distance $D_R$ between the relay lens 224 and the lens module 202 may be stipulated by the manufacturer of the relay lens 224, and the distance $D_v$ between the focal point 504 and the relay lens 224 may be determined by calculating the difference between the distances $D_f$ and $D_R$. For example, the distance $D_R$ may be 19 mm and the distance $D_v$ may be calculated as 19 mm-4.5 mm=14.5 mm.

Referring to FIG. 6, at 606, the method 600 then determines the real test distance (WDR) and dimensions of the test chart 302 based on the diagonal FOV ⊖ of the lens module 202 determined at 602.

At 608, the method 600 proceeds to determine a position for each reflective element 210, 212 of the apparatus 200. At 608, the relay lens FOV height for the relay lens 224 is first calculated. The relay lens FOV height may be calculated using the WDR (determined at 606) and the distance $D_v$ between the focal point 504 and the relay lens 224 (determined at 604). In particular, referring to FIG. 5, the relay lens FOV height may be the sum of WDR and the distance $D_v$, and may be calculated as WDR+$D_v$=460.94 mm+14.5 mm=475.44 mm.

Figure 9:
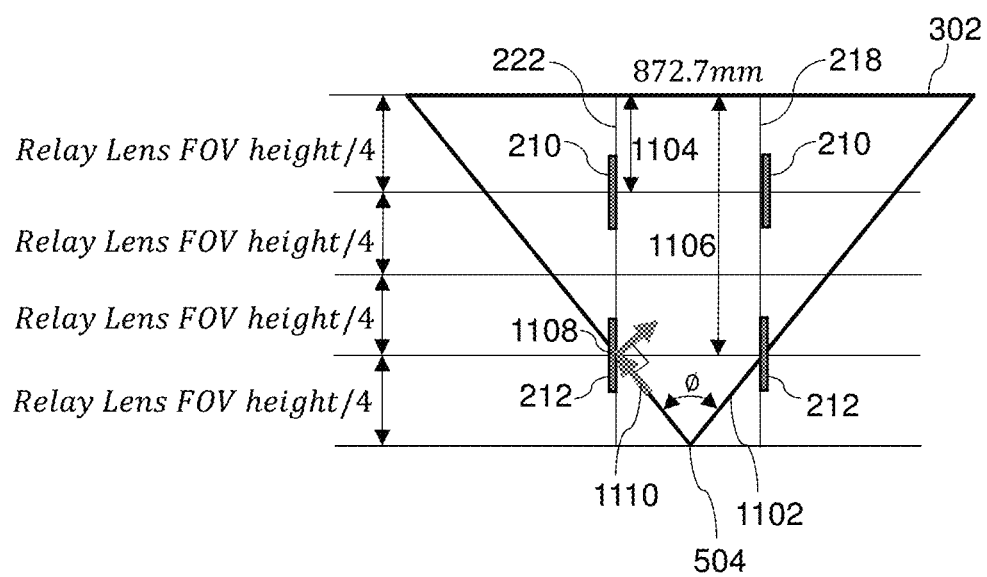
FIG. 9 shows a pyramidal field of view of the relay lens and how the reflective elements may be positioned relative to this pyramidal field of view in the setup of FIG. 5.

At 608, the positions of the reflective elements 210, 212 are then determined based on the relay lens FOV height. FIG. 9 shows a pyramidal FOV 1102 of the relay lens 224 having a height equal to the relay lens FOV height, and how the reflective elements 210, 212 may be positioned relative to this pyramidal FOV 1102. As shown in FIG. 9, the first reflective elements 210 may be positioned at a first distance 1104 from the test chart 302 (or in other words, the chart holder 206). This first distance 1104 may be measured from a center of each first reflective element 210 and may be approximately one quarter of the distance between the test chart 302 and the focal point 504 of the relay lens 224. The second reflective elements 212 may be positioned at a second distance 1106 from the test chart 302, where this second distance 1106 may similarly be measured from a center of each second reflective element 212 and may be approximately three quarters of the distance between the test chart 302 (or chart holder 206) and the focal point 504 of the relay lens 224. More specifically, the first distance 1104 may be calculated as (relay lens FOV height)/4, the second distance 1106 may be calculated as 3×(relay lens FOV height)/4, and a ratio of the first distance 1104 to the second distance 1106 may thus be calculated as 1:3. As further shown in FIG. 9, the second reflective elements 212 may be positioned with their centers intersecting (at intersection 1108) the relay lens pyramidal FOV 1102. The positioning of each second reflective element 212 may be such that an optical path 1110 along the relay lens pyramidal FOV 1102 incident on the second reflective element 212 is reflected at an angle of about 90 degrees. Further, each first reflective element 210 may be arranged such that the first reflective element 210 and a corresponding second reflective element 212 on the same mount 216-222 extend along a same axis.

Referring to FIG. 6, the method 600 then proceeds to determine (at 610) a size for each reflective element 210, 212. In the apparatus 200, the reflective elements 210, 212 are configured to have a size dependent on a size of the ROI 302a of the test chart 302. In particular, each first reflective element 210 may be configured to have a size at least twice of a size of the ROI 302a. Having larger first reflective elements 210 can help to reduce the possibility of the ROI 302a being absent in the first reflected images. Accordingly, at 610, a size of the ROI 302a is first calculated using the equation (Size of ROI 302a)=(Number of pixels in the test chart 302)×(dchart)/$\sqrt{X^2+Y^2}$ where the number of pixels in the test chart 302 is 250. The size of each first reflective element 210 may then be calculated as 2×(Size of ROI 302a) and the size of each second reflective element 212 may be the same size as, or a predetermined fraction of the size of each first reflective element 210.

Referring to FIG. 6, the method 600 subsequently determines (at 612) a design for the reflective elements holder assembly 214 based on the positions and sizes of the reflective elements 210, 212 as determined at 608 and 610.

Various modifications may be made to the above-described embodiments.

Figure 10:
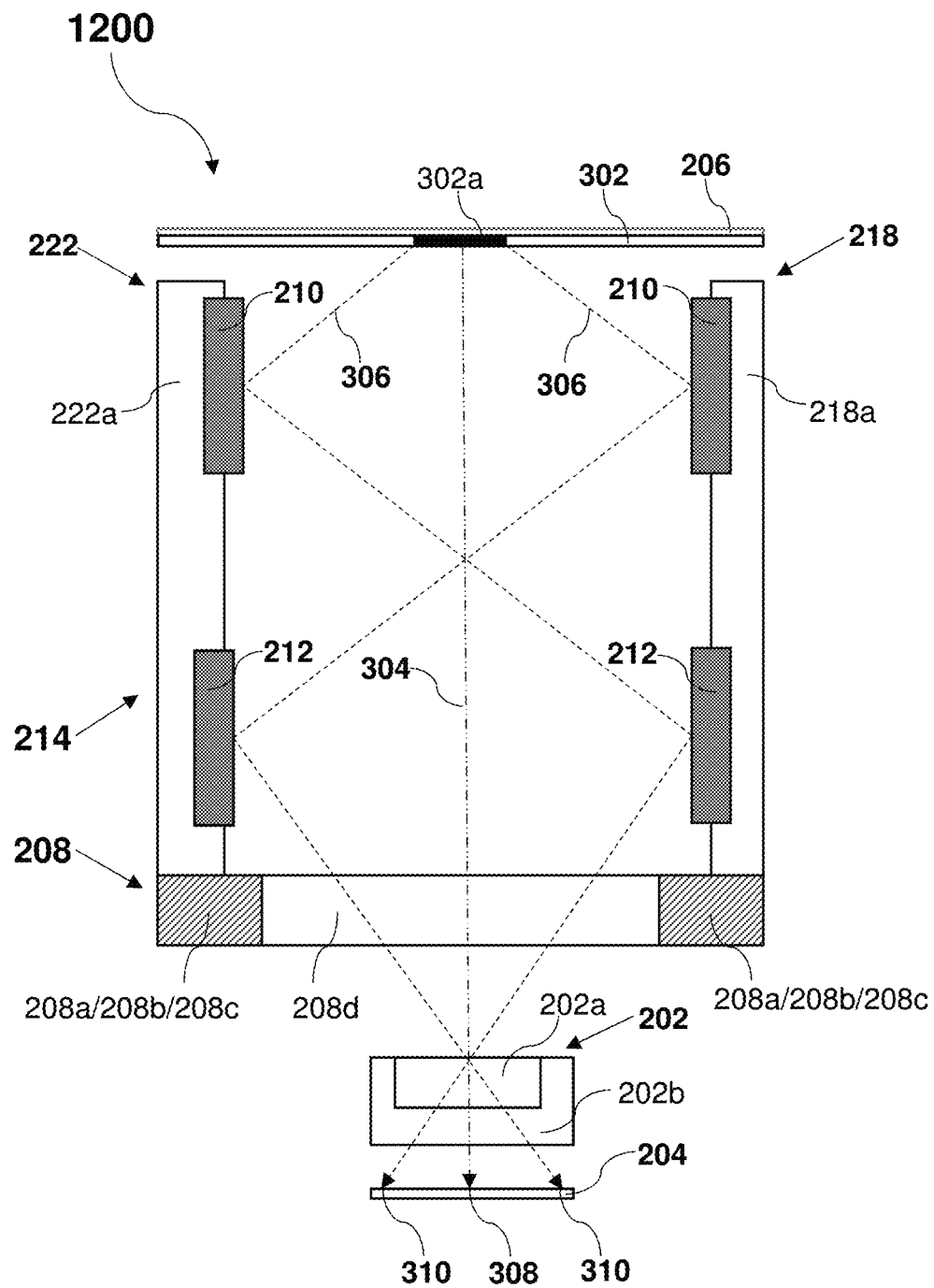
FIG. 10 shows an apparatus for aligning a lens module and an image sensor to form a camera module according to an alternative embodiment of the present invention.

For example, the relay lens 224 need not be present. FIG. 10 shows an apparatus 1200 for aligning a lens module 202 with an image sensor 204 according to an alternative embodiment of the present invention, when the apparatus 1200 is in use with a test chart 302 having an ROI 302a. The apparatus 1200 is similar to the apparatus 200 and thus, the same components are labelled with the same reference numerals and need not be described further. As shown in FIG. 10, the apparatus 1200 does not include the relay lens 224 and hence, the second optical paths 304, 306 from the ROI 302a directly pass through the hole at the bottom of the receptacle 208d to reach the lens module 202 and the image sensor 204.

Further, although the apparatus 200 is shown in FIGS. 2A and 2B to include eight reflective elements 210, 212, the number of reflective elements may differ. The number of mounts of the reflective elements holder assembly 214 may differ as well. In addition, each mount need not hold two reflective elements 210, 212 and may instead hold only one reflective element or more than two reflective elements. The sizes of the reflective elements 210, 212 may also differ from that in the apparatus 200. For example, the first reflective elements 210 need not have larger lengths and larger widths than the second reflective elements 212. Instead, the first reflective elements 210 may have a same size as the second reflective elements 212. Alternatively, the first reflective elements 210 may have larger lengths but same widths, or larger widths but same lengths as the second reflective elements 212. In an alternative embodiment, the apparatus 200 may include only two reflective elements directly facing each other, where the reflective elements may be large enough to reflect the second optical paths 306 more than once. In this alternative embodiment, the reflective elements holder assembly 214 may include only two mounts, each configured to hold one of the two reflective elements. In yet another alternative embodiment, the apparatus 200 may include twelve reflective elements arranged in a similar manner as the reflective elements 210, 212 of apparatus 200, except that each mount 216, 218, 220, 222 may hold three (instead of two) reflective elements and the second optical paths 306 may be reflected thrice.

In addition, the arrangement of the reflective elements 210, 212 may differ from that in the apparatus 200. For example, the reflective elements 210, 212 need not be circumferentially arranged at equal distances from adjacent reflective elements 210, 212 around the receptacle 208d. The reflective elements 210, 212 may be arranged in any manner as long as they are operative to reflect the second optical paths 306 from the ROI 302a to second positions 310 spaced from the first position 308.

Also, although the test chart 302 for use with the apparatus 200 is shown to include only a single ROI 302a, the test chart 302 may include more than one ROI. Further, the ROI 302a need not be at a center of the test chart 302. Instead, the ROI 302a may be at any position on the test chart 302 so long as the resulting image captured by the image sensor 204 includes a sufficient number of ROIs at positions that can allow an adequately extensive analysis of the images to facilitate alignment between the lens module 202 and the image sensor 204.

Further, although the reflective elements 210, 212 of the apparatus 200 are in the form of mirrors, these reflective elements 210, 212 may instead comprise any other reflective elements 210, 212 capable of reflecting the second optical paths 306. The reflective elements 210, 212 may be coupled with the reflective elements holder assembly 214 by any means that are known to those skilled in the art. For example, the reflective elements 210, 212 may be coupled with the mounts 216, 218, 220, 222 using dowel pins which may help to improve accuracy when positioning these reflective elements 210, 212.

The invention described herein is susceptible to variations, modifications and/or additions other than those specifically described and it is to be understood that the invention includes all such variations, modifications and/or additions which fall within the spirit and scope of the above description.

The invention claimed is:

1. An apparatus for aligning a lens module with an image sensor to form a camera module, the apparatus comprising:
a chart holder configured to hold a test chart comprising a region of interest;
a positioning unit comprising a lens module holder configured to hold the lens module and a sensor holder configured to hold the image sensor, wherein the positioning unit is operative to adjust a relative arrangement between the lens module holder and the sensor holder to align the lens module with the image sensor; and
a reflective elements holder assembly configured to hold a plurality of reflective elements between the chart holder and the positioning unit;
wherein the positioning unit is arranged relative to the chart holder to form a first optical path from the region of interest to be directed to a first position on the image sensor; and
wherein the plurality of reflective elements are positioned to form second optical paths by reflection from the region of interest to respective second positions on the image sensor, the second positions being spaced from the first position on the image sensor.

2. The apparatus according to claim 1, wherein the plurality of reflective elements comprise opposing reflective elements facing a center of the reflective elements holder assembly.

3. The apparatus according to claim 1, wherein the plurality of reflective elements are arranged to form the second optical paths by reflecting the second optical paths more than once between the region of interest and the image sensor.

4. The apparatus according to claim 1, wherein the apparatus further comprises a base unit configured to support the reflective elements holder assembly, the base unit having a hole to allow the first and second optical paths to pass through, and
wherein the plurality of reflective elements are circumferentially arranged around the hole of the base unit.

5. The apparatus according to claim 4, wherein each reflective element is spaced at equal distances from adjacent reflective elements around the hole of the base unit.

6. The apparatus according to claim 1, wherein each reflective element is arranged to extend along an axis parallel to an axis extending between the chart holder and the lens module holder.

7. The apparatus according to claim 1, wherein the reflective elements holder assembly comprises a plurality of spaced-apart mounts, each mount configured to hold at least one of the plurality of reflective elements.

8. The apparatus according to claim 1, wherein the plurality of reflective elements comprise first reflective elements and second reflective elements, wherein the first reflective elements are arranged nearer to the chart holder than the second reflective elements.

9. The apparatus according to claim 8, wherein each first reflective element and a corresponding second reflective element are arranged to extend along a same axis.

10. The apparatus according to claim 8, wherein the second optical paths form a first reflected image in each first reflective element, each first reflected image comprising an image of the region of interest; and
wherein each first reflective element has a size which is at least twice of a size of the region of interest.

11. The apparatus according to claim 8, wherein reflections along the second optical paths by the first reflective elements form a second reflected image in each second reflective element; and wherein each second reflected image comprises an image of the region of interest of the test chart and an image of one of the first reflective elements.

12. The apparatus according to claim 8, wherein the first reflective elements are of a same size or larger than the second reflective elements.

13. The apparatus according to claim 8, wherein the first reflective elements and the second reflective elements are respectively positioned a first distance and a second distance away from the chart holder, and wherein a ratio of the first distance to the second distance is about 1:3.

14. The apparatus according to claim 8, further comprising a relay lens arranged between the positioning unit and the reflective elements holder assembly.

15. The apparatus according to claim 14, wherein a distance between the second reflective elements and the chart holder is approximately three quarters of a distance between the chart holder and a focal point of the relay lens.

16. The apparatus according to claim 1, wherein the region of interest of the test chart is positioned at a center of the test chart.

17. The apparatus according to claim 1, wherein the first position on the image sensor is at a center of the image sensor.

18. The apparatus according to claim 1, wherein the second positions on the image sensor are at corners of the image sensor.

19. The apparatus according to claim 1, wherein the plurality of reflective elements comprise mirrors.

\* \* \* \* \*